United States Patent
Lee et al.

(10) Patent No.: US 6,844,983 B2
(45) Date of Patent: Jan. 18, 2005

(54) NEAR-FIELD OBJECTIVE LENS FOR AN OPTICAL HEAD

(75) Inventors: Yuan-Chin Lee, Hsinchu Hsien (TW); Jau-Jiu Ju, Hsinchu Hsien (TW); Tzuan-Ren Jeng, Hsinchu Hsien (TW); Wen-Yih Liao, Hsinchu Hsien (TW); Chi-Lone Chang, Hsinchu Hsien (TW); Jyh-Shong Ju, Hsinchu Hsien (TW); Kuo-Chi Chiu, Hsinchu Hsien (TW); Chih-Yuan Wu, Hsinchu Hsien (TW)

(73) Assignee: Industrial Technology Research Institute (TW)

( * ) Notice: Subject to any disclaimer, the term of this patent is extended or adjusted under 35 U.S.C. 154(b) by 21 days.

(21) Appl. No.: 10/618,680

(22) Filed: Jul. 15, 2003

(65) Prior Publication Data

US 2004/0125460 A1 Jul. 1, 2004

(30) Foreign Application Priority Data

Dec. 31, 2002 (TW) .................................. 91138073 A

(51) Int. Cl.$^7$ .......................... G02B 21/02; G02B 3/04; G02B 11/00; G11B 11/00
(52) U.S. Cl. ...................... 359/661; 359/664; 369/13.33
(58) Field of Search ................................. 359/661, 664; 369/13.33

(56) References Cited

U.S. PATENT DOCUMENTS

2003/0173501 A1 * 9/2003 Thio et al. .................. 250/216

* cited by examiner

Primary Examiner—Scott J. Sugarman
(74) Attorney, Agent, or Firm—Birch, Stewart, Kolasch & Birch, LLP

(57) ABSTRACT

A near-field optical head objective lens that can read and write high-density data on an optical disc is disclosed. On a surface where an incident beam converges by the near-field optical head objective lens, a film that can produce surface plasmon effect is coated. As the incident beam hits the material and produces the surface plasmon, a micro aperture is generated to minimize the diameter of the light spot, thereby increasing the data capacity stored in the optical disc.

10 Claims, 5 Drawing Sheets

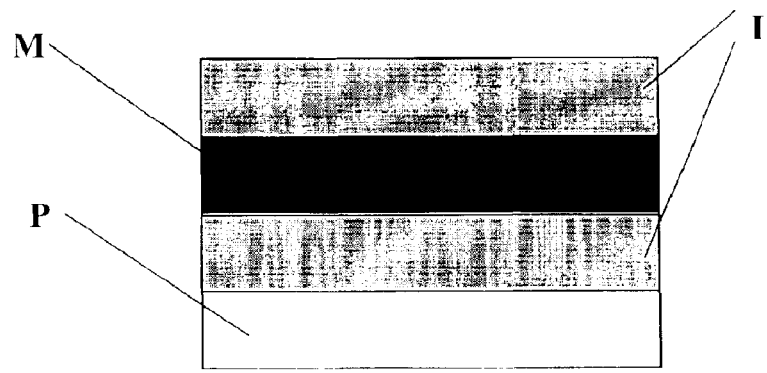
FIG.8-1
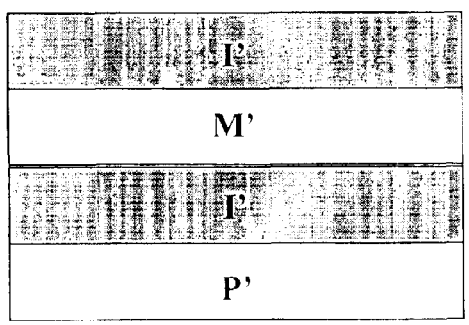   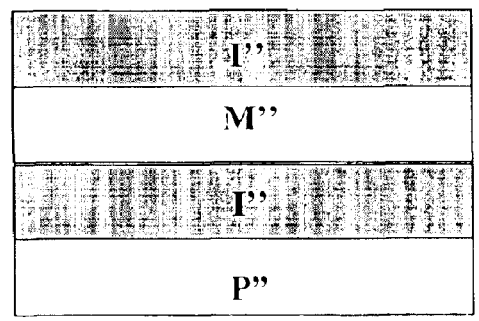
FIG.8-2   FIG.8-3

NEAR-FIELD OBJECTIVE LENS FOR AN OPTICAL HEAD

BACKGROUND OF THE INVENTION

1. Field of Invention

The invention relates to an optical head objective lens and, in particular, to an optical head objective lens that uses the near-field optics and a micro aperture generated via the surface plasmon effect to minimize the size of the light spot.

2. Related Art

The task of an optical head objective lens is to generate a light spot with a small diameter. The smaller the diameter is, the higher the storage capacity of the optical disk is. The diameter of the light spot is inversely proportional to the numerical aperture (NA) of the objective lens. It is known that NA=n* sin θ, where n is the index of refraction at the point where the light beam converges and θ is the angle between the outermost ray and the optical axis of the incident beam. Therefore, one can try to increase the NA of the beam to minimize the light spot. The conventional optical head objective lens uses the far-field design whose limit NA value is 1. Using the near-field optics principle can easily make the NA greater than 1.

The basic structure of a conventional near-field optical head objective lens is shown in FIG. 1. It includes the combination of a convergent lens 10 and hemispheric lens 11. When the convergent lens 10 converges the laser beam to the lower surface of the hemispheric lens, the beam is totally reflected as a result of an appropriate combination of the index of refraction n of the hemispheric lens and the incident angle. When the disc 12 is close to the hemispheric lens 11, the light totally reflected from the hemispheric lens 11 will propagate its energy to the underneath disc in the form of evanescent waves when the distance is properly adjusted. As the distance changes, the energy carried by the evanescent waves also varies, resulting in 0 and 1 signals. The NA value is n*sin θ, the size of the light spot is about λ/NA, where λ is the wavelength. Suppose, λ=660 nm, n=2.0, and sin θ=0.6, the diameter of the light spot thus generated is about 550 nm. Using the full width at half maximum of the energy spectrum, one obtains a diameter of about 280 nm. The increase in the NA value of such objective lenses is very limited. Another type of near-field optical head objective lens is shown in FIG. 2. A super-spherical lens 14 replaces the original hemispheric lens 11. The NA value of such objective lenses is $n^2$*sin θ. Using the same set of values as before, we obtain NA=2.4 and the light spot size is about 280 nm. Using the full width at half maximum of the energy spectrum, one obtains a diameter of about 140 nm. The diameter is shrunk by a factor of about 2. However, the precision requirement in manufacturing such super-spherical structure 14 is very high. Therefore, there are difficulties in mass production.

To solve the problems in minimizing the light spot and manufacturing difficulties, the structure shown in FIG. 3 was proposed. A metal film 18 is coated onto the lower convergent surface of the hemisphere of a conventional near-field objective lens. A micro aperture 19 is further opened at the place where the light spot becomes focused on the metal film 18. The light spot size is then directly related to that of the aperture. If one can control the aperture size below 100 nm, the light spot should have a size also of order 100 nm. However, one difficulty is the alignment between the micro aperture and the laser beam. For this problem, a structure as in FIG. 4 was proposed. A micro aperture array 24 is formed on the metal film to lower the difficulty in alignment. With regard to the high-density data storage technology, Junji Tominaga et al. proposed the concept of a super-resolution near-field structure (Super-RENS) in April 1998. As shown in FIG. 5, when the laser beam is converged by the convergent objective lens 10, it is sent to an optical disc 31 with the Super-RENS. Once the light touches the film 31-$b$ that generates the surface plasmon effect, only beams whose central energy is greater than a particular threshold intensity can pass through. The intensity of the penetrated beam will further be amplified. Moreover, the light spot size is not sensitive to the wavelength. Therefore, the light spot diameter on the recording layer 31-$d$ can be minimized. It also has the advantage of a superior energy usage rate. The use of a surface plasmon film makes it possible to shrink the converged light spot diameter down to less than 200 nm.

The structure of coating a metal film on the lower convergent surface of the hemisphere of a conventional near-field objective lens has a very low energy usage rate because of the small aperture and the low penetration rate. Although coating a homogeneous surface plasmon film on the Super-RENS optical disc can solve the problem in energy use, there is still technical difficulty in making a large-area surface plasmon film (usually with a diameter of 120 mm). Besides, other problems in making near-field objective lenses (such as using a material with a large index of refraction, a short-wavelength light source, or positioning when using metal micro apertures) are limitations derived from minimizing the light spot diameter.

SUMMARY OF THE INVENTION

In view of the foregoing, the invention proposes to coat a surface plasmon film under the light spot convergent surface of an existing near-field optical head objective lens. Since the surface plasmon film required here covers a smaller area than those in the prior art, it can solve the homogeneity problem occurring to the surface plasmon film.

Using the invention can minimize the light spot to the nanometer scale. A smaller data track pitch is thus achieved when the optical drive pickup head writes into the optical disc. The data storage density is increased to hundreds of GB. The manufacturing process is simple and applicable to all near-field objective lenses. The light spot size thus generated is not sensitive to the wavelength, either. Therefore, it is foreseen that the invention will have a great impact on the future high-density optical drive industry.

BRIEF DESCRIPTION OF THE DRAWINGS

The invention will become more fully understood from the detailed description given hereinbelow illustration only, and thus are not limitative of the present invention, and wherein:

FIG. 8-1 is a schematic view of the disclosed film structure that generates the surface plasmon effect;

FIG. 8-2 is a schematic view of the first embodiment of the disclosed film structure that generates the surface plasmon effect; and FIG. 8-3 is a schematic view of the second embodiment of the disclosed film structure that generates the surface plasmon effect.

DETAILED DESCRIPTION OF THE INVENTION

Figure 6:
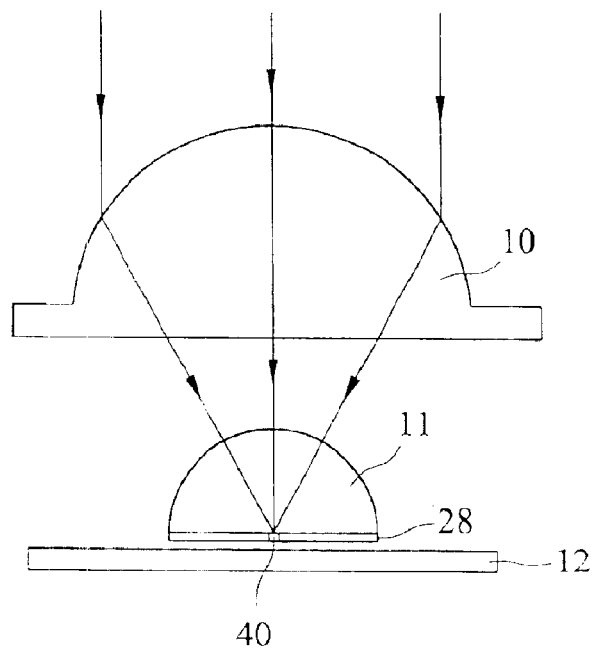
FIG. 6 is a schematic view of the disclosed near-field optical head objective lens.

With reference to FIG. 6, any existing near-field objective lens 11 is coated under its light spot convergent surface with a film 28 that can produce the surface plasmon effect. When the laser beam enters the super-resolution near-field structure (Super-RENS), a micro aperture 40 is produced in the film 28. Not only can the light spot size be effectively minimized, the light spot size can be modulated by the energy of the laser beam. Moreover, the Super-RENS has a magnifying effect on the energy at the center of the light spot. Therefore, the energy usage rate can be increased.

Figure 7:
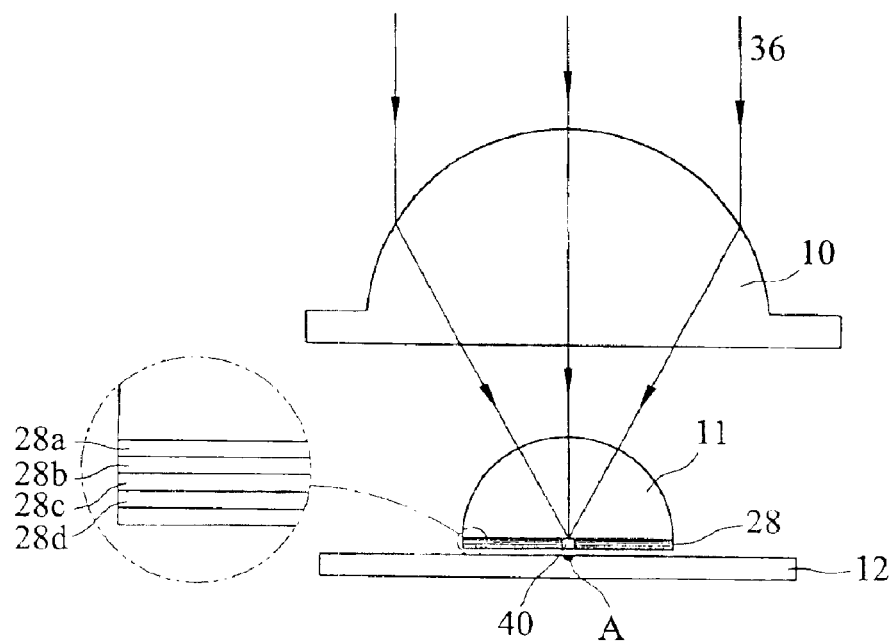
FIG. 7 is a schematic view of an embodiment of the disclosed near-field optical head objective lens.

We use an embodiment shown in FIG. 7 to explain the disclosed near-field optical head objective lens. A film 28 that can produce the surface plasmon effect is coated under the hemispheric lens 11 of a conventional near-field objective lens. In particular, 28-*a* and 28-*c* are SiN protective layers, 28-*b* is an inner layer that can produce the surface plasmon effect, and 28-*d* is an outer protective layer. When an incident light 36 enters the convergent lens 10, the beam is converged to the hemispheric lens 11. Since the focal point of the lens 10 coincides with the spherical center of the hemispheric lens 11, the beam is converged to the lower surface of the hemispheric lens 11. The light spot size is about $\lambda/n*NA$, where $\lambda$ is the wavelength of the incident beam and n is the index of refraction. Since an Sb film 28 is coated under the hemispheric lens 11, the Sb inner layer 28-*b* under the light spot will generate a micro aperture 40 on the film 28 due to the surface plasmon effect, further shrinking the light spot and enhancing the intensity at the center of the beam. Due to the near-field optics effect, part of the beam energy penetrates through the air gap about tens of nanometers thick and propagates to the disc 12. The upper part of the disc 12 is formed with a light spot A of about the size of the micro aperture 40. When the optical drive pickup head reads the disc, data on the disc 12 are read by detecting the beam energy that penetrates through or reflects from the disc 12.

Figure 1:
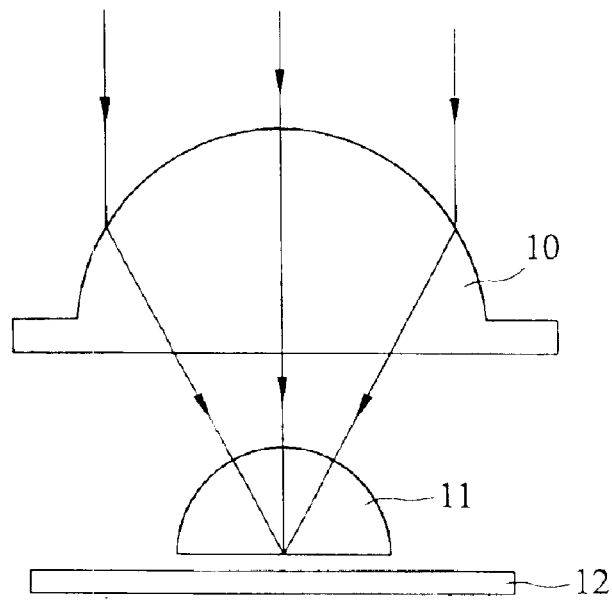
FIG. 1 is a schematic view of a conventional hemispheric near-field optical objective lens.
Figure 2:
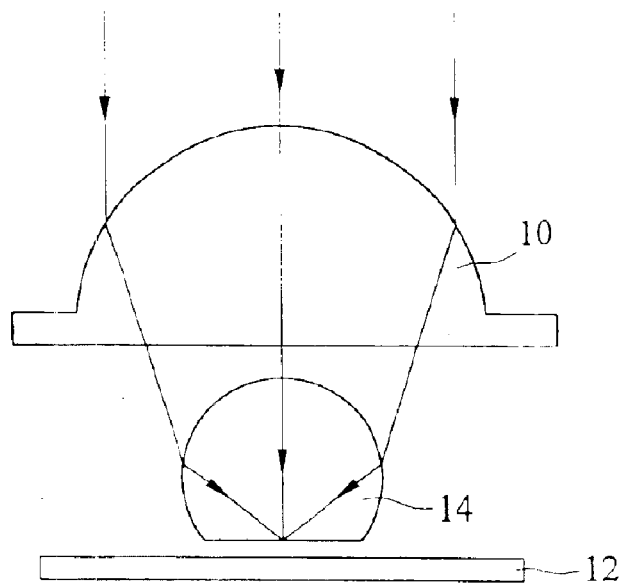
FIG. 2 is a schematic view of a conventional super-spherical near-field optical objective lens.
Figure 3:
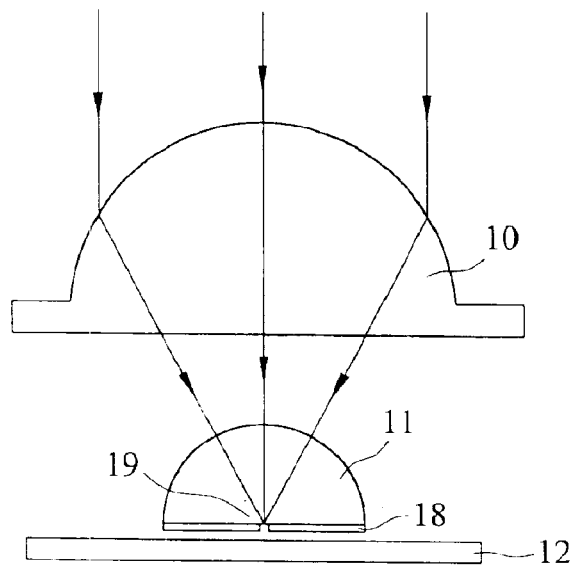
FIG. 3 is a schematic view of an improved hemispheric near-field optical objective lens.
Figure 4:
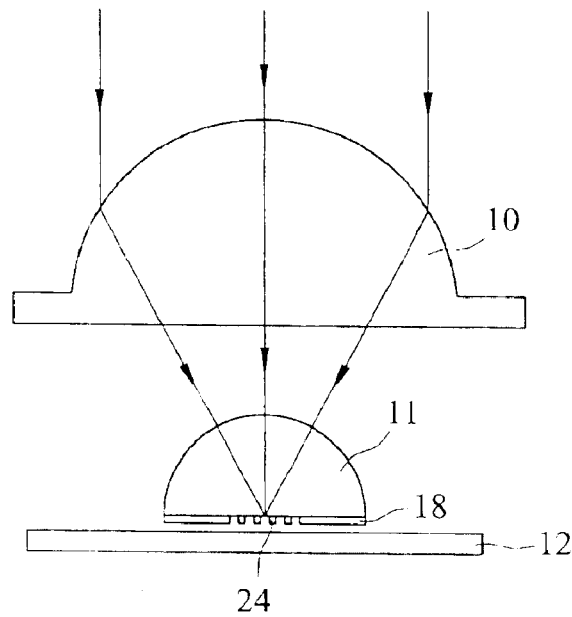
FIG. 4 is a schematic view of an improved hemispheric near-field optical objective lens with arrayed micro apertures.
Figure 5:
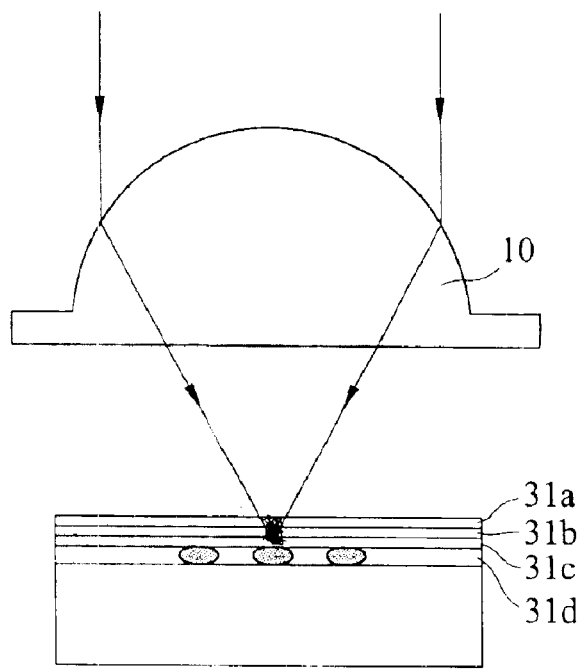
FIG. 5 is a schematic view of a Super-RENS.

With reference to FIG. 8-1, the disclosed film structure includes interface layers I, I', I", mark layers M, M', M", and protective layers p, p', p". The material of the interface layers I, I', I" can be ZnS—SiO2, SiN, AlN, and SiO2. The material of the mark layers M, M', M" can be AgOx and Sb. As shown in FIGS. 8-2 and 8-3, an embodiment of the disclosed film structure that can generate the surface plasmon effect. The interface layer I' is made of ZnS—SiO2, and the mark layer M' is made of AgOx. In FIG. 8-3, the interface layer I" is made of SiN, and the mark layer M" is made of Sb. To protect the film, a hard protective layer P (e.g. $MgF_2$) can be coated under the layer.

Certain variations would be apparent to those skilled in the art, which variations are considered within the spirit and scope of the claimed invention.

What is claimed is:

1. A near-field optical head objective lens comprising:

a convergent surface, where an incident beam converges to a focal point; and a film, which is formed at the focal point of the convergent surface;

wherein the incident light passes the film and generates the surface plasmon effect on the film surface, and a micro aperture is produced to minimize the diameter of a light spot thus formed.

2. The near-field optical head objective lens of claim 1 used in an optical drive pickup head.

3. The near-field optical head objective lens of claim 2, wherein the data reading and writing of the optical drive is achieved using the pickup head with the near-field optical head objective lens.

4. The near-field optical head objective lens of claim 1, wherein the film contains at least a plurality of interface layers, a mark layer, and a recording layer.

5. The near-field optical head objective lens of claim 4, wherein the material of the interface layer is selected from the group consisting of ZnS—SiO, SiN, AlN, and SiO2.

6. The near-field optical head objective lens of claim 4, wherein the material of the mark layer is selected from the group consisting of AgOx and Sb.

7. The near-field optical head objective lens of claim 4, wherein the material of the interface layer is ZnS—SiO2 and the material of the mark layer is AgOx.

8. The near-field optical head objective lens of claim 4, wherein the material of the interface layer is SiN and the material of the mark layer is Sb.

9. The near-field optical head objective lens of claim 1 further including a convergent lens and a hemispheric lens.

10. The near-field optical head objective lens of claim 1 further including a convergent lens and a super-spherical lens.

* * * * *